(12) United States Patent
List et al.

(10) Patent No.: US 11,442,472 B1
(45) Date of Patent: Sep. 13, 2022

(54) SYSTEM AND METHOD FOR AUTOMATED FLIGHT PLAN REPORTING IN AN ELECTRIC AIRCRAFT

(71) Applicant: BETA AIR, LLC, South Burlington, VT (US)

(72) Inventors: Alexander Hoekje List, South Burlington, VT (US); Vincent Moeykens, Burlington, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/406,912

(22) Filed: Aug. 19, 2021

(51) Int. Cl.
| | |
|---|---|
| B64D 27/24 | (2006.01) |
| G05D 1/10 | (2006.01) |
| B64D 43/00 | (2006.01) |
| G01C 23/00 | (2006.01) |
| G05D 1/00 | (2006.01) |
| G06F 21/60 | (2013.01) |
| G06F 16/22 | (2019.01) |
| G06F 3/14 | (2006.01) |
| H04L 9/40 | (2022.01) |

(Continued)

(52) U.S. Cl.
CPC ............. G05D 1/101 (2013.01); B64D 27/24 (2013.01); B64D 43/00 (2013.01); G01C 23/005 (2013.01); G05D 1/0038 (2013.01); G06F 3/14 (2013.01); G06F 16/22 (2019.01); G06F 21/602 (2013.01); H04L 63/0884 (2013.01); G06Q 10/06315 (2013.01); G06Q 50/30 (2013.01)

(58) Field of Classification Search
CPC .. B60L 58/16; B60L 50/60; B60L 1/00; B60L 2260/54; B60L 2200/10; B60L 50/66; B60L 2250/16; B60L 2240/547; B60L 50/40; B60L 2240/549; B60L 2240/662; B60L 2240/545; B60L 50/70; B60L 2240/622; B64F 5/60; B64D 45/00; B64D 43/00; B64D 47/00; B64D 2221/00; B64D 2045/0085; B64D 27/24; B64C 29/0025; G07C 5/06; Y02T 10/72; Y02T 90/16; Y02T 10/70
See application file for complete search history.

(56) References Cited

U.S. PATENT DOCUMENTS 9,609,288 B1 * 3/2017 Richman ................ H04N 7/185
11,009,867 B1 5/2021 West
(Continued)

OTHER PUBLICATIONS

Jamrok, Aircraft datalink communications for the fure, 2001, IEEE, p. 1-9 (Year: 2001).*
(Continued)

Primary Examiner — McDieunel Marc
(74) Attorney, Agent, or Firm — Caldwell Intellectual Property Law

(57) ABSTRACT

A system for automated flight plan reporting for an electric aircraft, the system including a flight controller coupled to the electric aircraft configured to receive a digital datum from a remote device, generate a plan adjustment datum as a function of the digital datum, and transmit the plan adjustment datum to a pilot display, a pilot display coupled to the electric aircraft, wherein the pilot display is configured to receive the plan adjustment datum from the flight controller, display the plan adjustment datum to a user; and receive a confirmation datum from the user.

19 Claims, 8 Drawing Sheets

(51) Int. Cl.
*G06Q 50/30* (2012.01)
*G06Q 10/06* (2012.01)

(56) References Cited

U.S. PATENT DOCUMENTS

| | | | | |
|---|---|---|---|---|
| 11,142,333 | B1* | 10/2021 | Richter | G05D 1/0858 |
| 11,208,200 | B1* | 12/2021 | Auerbach | G05D 1/0077 |
| 2019/0115974 | A1 | 4/2019 | Frolov et al. | |
| 2019/0130783 | A1* | 5/2019 | Nissen | G09B 9/12 |
| 2020/0225684 | A1 | 7/2020 | Anderson et al. | |
| 2020/0265726 | A1 | 8/2020 | Dupray et al. | |
| 2020/0279367 | A1* | 9/2020 | White | G06F 16/583 |
| 2020/0349852 | A1 | 11/2020 | Dicosola | |
| 2020/0372814 | A1 | 11/2020 | Bos et al. | |
| 2021/0209331 | A1* | 7/2021 | Grant | G06K 9/325 |
| 2021/0309110 | A1* | 10/2021 | Wiegman | B64C 29/0008 |
| 2021/0309383 | A1* | 10/2021 | Clark | G05D 1/0808 |
| 2021/0309392 | A1* | 10/2021 | Wiegman | B64D 31/06 |
| 2021/0313804 | A1* | 10/2021 | Wiegman | B64D 35/02 |
| 2021/0380224 | A1* | 12/2021 | Clark | G06N 20/00 |

OTHER PUBLICATIONS

Mulkerin et al., A data communications concept for a SATS scenario, 2004, IEEE, p. 1-8 (Year: 2004).*

Taylor et al., A reconfigurable integrated navigation and flight management system for military transport aircraft, 1989, IEEE, p. 1775-1781 (Year: 1989).*

Fulton et al., Automated General Aviation Protection System for manned and unmanned aircraft, 2011, IEEE, p. 1-16 (Year: 2011).*

JAPCC, The Joint Air Power Competence Centre (JAPCC) Flight Plan for Unmanned Aircraft Systems (UAS) in NATO , Mar. 10, 2008.

Stouffer et al., Reliable, Secure, and Scalable Communications, Navigation, and Surveillance (CNS) Options for Urban Air Mobility (UAM), Aug. 12, 2020.

* cited by examiner

US 11,442,472 B1

SYSTEM AND METHOD FOR AUTOMATED FLIGHT PLAN REPORTING IN AN ELECTRIC AIRCRAFT

FIELD OF THE INVENTION

The present invention generally relates to the field of electric aircraft. In particular, the present invention is directed to systems and methods for automated flight plan reporting in an electric aircraft.

BACKGROUND

An air traffic control tower may have to route thousands of aircrafts each day, with little to no margin of error allowed. Having data related to an electric aircraft's flight plan that is automatically updated, while being properly authenticated, may be helpful for ensuring safe and efficient routing of aircrafts.

SUMMARY OF THE DISCLOSURE

In an aspect a system for automated flight plan reporting for an electric aircraft, the system including a flight controller coupled to the electric aircraft configured to receive a digital datum from a remote device, generate a plan adjustment datum as a function of the digital datum, and transmit the plan adjustment datum to a pilot display, a pilot display coupled to the electric aircraft, wherein the pilot display is configured to receive the plan adjustment datum from the flight controller, display the plan adjustment datum to a user; and receive a confirmation datum from the user.

In another aspect a method for automated flight plan reporting in an electric aircraft, the method including receiving, by a flight controller, a digital datum from a remote device, generating, by the flight controller, a plan adjustment datum as a function of the digital datum, transmitting, by the flight controller, the plan adjustment datum to a pilot display, receiving, by a pilot display, the plan adjustment datum from the flight controller, displaying, at the pilot display, the plan adjustment datum to a user; and receiving, at the pilot display a confirmation datum from the user.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for automated flight plan reporting in an electric aircraft. In an embodiment, a flight controller coupled to the electric aircraft receives a flight plan datum from a remote device, such as an air traffic control tower, automatically, the flight controller also transmits a flight plan datum to a computing device, such as a pilot display inside the aircraft, the pilot display receives the flight plan datum and displays it to a user.

Aspects of the present disclosure can be used to automatically update information related to an aircraft's flight plan, and any changes made to that plan, such as the aircraft deviating from a set flight plan or a user making changes to the set flight plan. Aspects of the present disclosure can also be used to transmit and receive flight plan datum through a digital radio frequency. This is so, at least in part, because the system is configured to communicate with remote devices using digital radio standard.

Aspects of the present disclosure allow for a brokered authentication system, where an authentication broker may be at a recharging pad, such as a server in the recharging pad. Exemplary embodiments illustrating aspects of the present disclosure are described below in the context of several specific examples.

Figure 1:
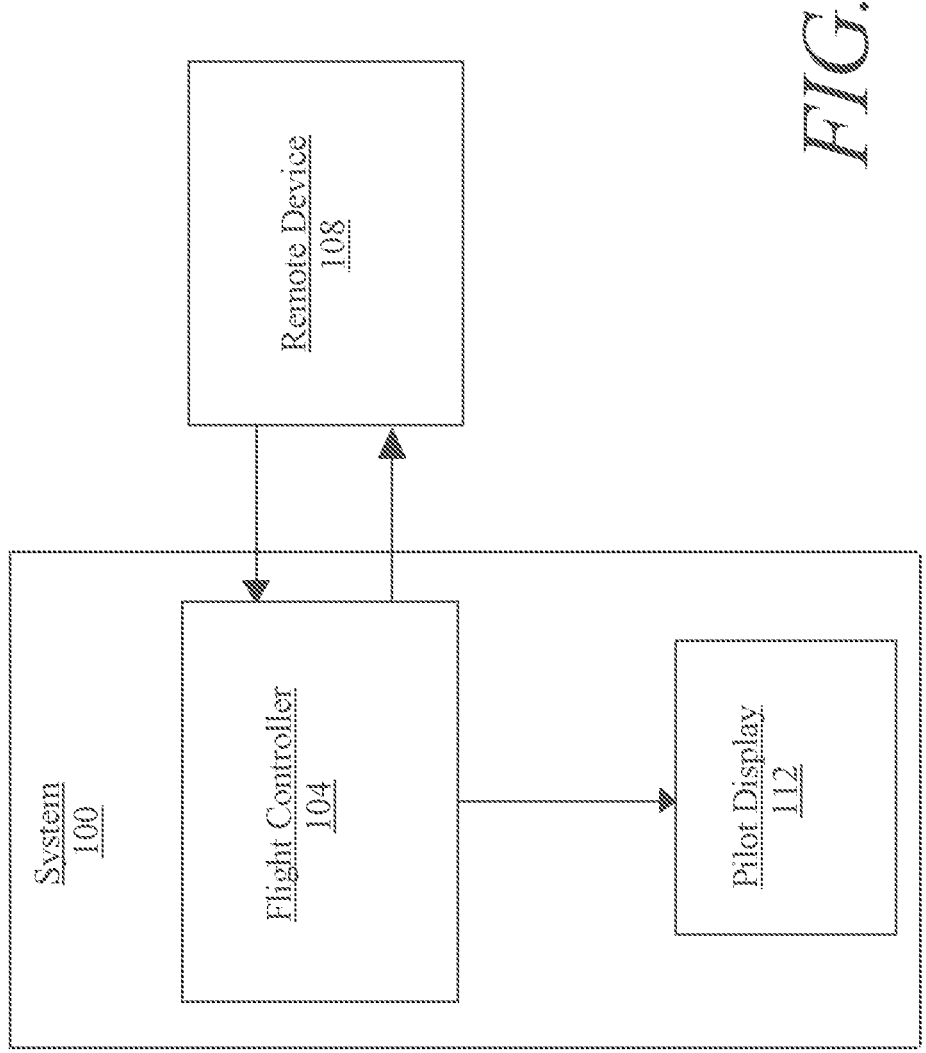
FIG. 1 is an illustrative block diagram of a system for automated flight plan reporting in an electric aircraft.

Referring now to FIG. 1, an exemplary embodiment of a system 100 for automated flight plan reporting in an electric aircraft is illustrated. System 100 includes a flight controller 104. Flight controller 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Flight controller 104 may include a single computing device operating independently, or may include two or more computing device operating in concert, in parallel, sequentially or the like; two or more computing devices may be included together in a single computing device or in two or more computing devices. Flight controller 104 may interface or communicate with one or more additional devices as described below in further detail via a network interface device. Network interface device may be utilized for connecting flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Flight controller 104 may include but is not limited to, for example, a computing device or cluster of computing devices in a first location and a second computing device or cluster of computing devices in a second location. Flight controller 104 may include one or more computing devices dedicated to data storage, security, distribution of traffic for load balancing, and the like. Flight controller 104 may distribute one or more computing tasks as described below across a plurality of computing devices of computing device, which may operate in parallel, in series, redundantly, or in any other manner used for distribution of tasks or memory between computing devices. Flight controller 104 may be implemented using a "shared nothing" architecture in which data is cached at the worker, in an embodiment, this may enable scalability of system 100 and/or flight controller 104.

With continued reference to FIG. 1, flight controller 104 may be designed and/or configured to perform any method, method step, or sequence of method steps in any embodiment described in this disclosure, in any order and with any degree of repetition. For instance, flight controller 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Continuing to refer to FIG. 1, flight controller 104 is configured to receive a digital datum from a remote device 108. In one embodiment, the remote device may be a recharging pad. In some embodiments, the remote device may be an air traffic control tower. In some embodiments, the remote device may be a device in another aircraft. The remote device 108 may include any computing device communicatively connected to the flight controller 104, and/or an authentication broker. A "digital datum", as used herein for the purposes of this disclosure, refers to at least an element of data identifying a command to change a current flight plan of the aircraft, such as a command to increase altitude, that is transmitted in digital form, such as sound transmission to a digital radio. "Flight plan", for the purpose of this disclosure, refers to the optimum set of maneuvers, or commands, to be performed by the automated electric aircraft in order to reach a set objective. Flight plan may be consistent with disclosure of flight plan in U.S. patent application Ser. No. 17/365,512 and titled "PILOT-CONTROLLED POSITION GUIDANCE FOR VTOL AIRCRAFT", which is incorporated herein by reference in its entirety. In an embodiment, the digital datum may be encrypted. In some embodiments, the digital datum may be encrypted using asymmetric key encryption. In some embodiments, flight controller 104 is configured to decrypt the digital datum. In some embodiments, remote device may be a charging pad. In embodiments, remote device 108 may include a computing device operated by a fleet operator. In embodiments, remote device 108 may include air traffic control. In embodiments, remote device 108 may include a computing device operated by an air traffic controller.

Encryption process may involve the use of a datum, known as an "encryption key," to alter plaintext. Cryptographic system may also convert cyphertext back into plaintext, which is a process known as "decryption." Decryption process may involve the use of a datum, known as a "decryption key," to return the cyphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the cyphertext. One example of a symmetric cryptographic system is the Advanced Encryption Standard ("AES"), which arranges plaintext into matrices and then modifies the matrices through repeated permutations and arithmetic operations with an encryption key.

Still referring to FIG. 1. In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

Still referring to FIG. 1. Some embodiments of the disclosed systems and methods involve creation and/or evaluation of digital signatures. A digital signature as used herein is a secure proof performed on an element of data, referred to as a "message"; secure proof may include any secure proof as described in this disclosure. Message may include without limitation an encrypted mathematical representation of a file or other set of data. File or set of data may confer credentials, which may demonstrate, without limitation, any result of any authentication or authorization process performed by a signing device. Credentials, which may take the form of authorization tokens, may be generated, conferred, signed, or otherwise manipulated in any suitable way. Secure proof may be enacted, without limitation, by encrypting message using a private key of a public key cryptographic system. Signature may be verified by decrypting the encrypted mathematical representation using the corresponding public key and comparing the decrypted representation to a purported match that was not encrypted; if the signature protocol is well-designed and implemented correctly, this means the ability to create the digital signature is equivalent to possession of the private decryption key. Likewise, if mathematical representation of file is well-designed and implemented correctly, any alteration of the file will result in a mismatch with the digital signature; the mathematical representation may be produced using an alteration-sensitive, reliably reproducible algorithm, such as a hashing algorithm as described in further detail below. A mathematical representation to which the signature may be compared may be included with signature, for verification purposes; in other embodiments, the algorithm used to produce the mathematical representation is publicly available, permitting the easy reproduction of the mathematical representation corresponding to any file.

Still referring to FIG. 1. In some embodiments, persons, devices, or transactions may be authenticated or assigned a confidence level using digital certificates and/or cryptographic keys. In one embodiment, a digital certificate is a file that conveys information and links the conveyed information to a "certificate authority" that is the issuer of a public key or manager of public keys issued by other entities in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

Continuing to refer to FIG. 1. In some embodiments, a third party such as a certificate authority (CA) is available to verify that the possessor of the private key is a particular entity or member of a particular group; thus, if the certificate authority may be trusted, and the private key has not been stolen, the ability of an entity to produce a digital signature confirms the identity or membership of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature, or a member of the group to which the entity purportedly belongs; for instance, if the public key that decrypts the known signature also decrypts the digital signature, where determining that decryption has occurred authentically may include an expected value, datum, etc., in non-limiting example in the case of a keyed-hash message authentication code (keyed HMAC) or hash-based authentication code (HMAC), the digital signature may be considered verified. Digital signature may also be used to verify that the file has not been altered since the formation of the digital signature.

Still referring to FIG. 1, a certificate authority may include an authentication broker that is configured to assign authentication tokens. In embodiments, authentication broker may be connected to an identity store to verify identity of entities being authenticated. Identity store may be a remote database, a certificate authority, a database locally coupled to the authentication broker, or any other system configured to store identification of devices and/or users. In a nonlimiting example, authentication broker may be used by an organization to assign security token within a closed authentication ecosystem. In another nonlimiting example, authentication broker may be incorporated in a charging pad, where devices authenticated locally and only a local identity store is synched periodically with a remote database.

In an embodiment, a certificate authority may include a manufacturer of a device. For instance, manufacturer may verify that a private key, or secret usable to produce a secure proof as set forth in further detail below, available to a device is associated with one or more devices produced by the manufacturer; verification may take the form of a digital signature created by the manufacturer, signing a verification datum and/or public key corresponding to the private key and/or secret belonging to the device. Verification may be performed, without limitation, by physically and/or electrically validating a silicon die or other physical circuit element, for instance via automated test equipment, a probe station or other direct or indirect means of interrogating a circuit to validate that it is authentically manufactured, provides a particular expected behavioral result, or the like; such verification may, for instance, permit a manufacturer to determine that a sub-component or assembly manufactured by another party in a supply chain was constructed authentically according to a design of the manufacturer. Verification may additionally or alternatively be performed by reliance upon the trustworthiness of a subcomponent manufacturer, and/or utilizing a cryptographic attestation result of such a subcomponent. In non-limiting example, a device integrating an Intel SGX-enabled processor or other hardware or software device configured to perform an attestation of credentials may configure the processor to perform an attestation to the processor's manufacturer, make a determination as to the trustworthiness of the processor based upon the attestation result, utilize this determination on the result as evidence of correct construction, and sign a verification datum and/or pubic key corresponding to the private key and/or secret belonging to the device.

Still referring to FIG. 1. Private key and/or secret may be device-specific or may be issued to a group of devices; in the latter case, a device signing with private key and/or generating a secure proof based on secret may convey that it belongs to that group of devices, without making it possible for a device evaluating the signature and/or secure proof to identify the specific device other than as a member of the group. A secure proof, as used herein, is a protocol whereby an output is generated that demonstrates possession of a secret, such as a secret stored in or produced by originating device, without demonstrating the entirety of the secret; in other words, a secure proof by itself, is insufficient to reconstruct the entire secret, enabling the production of at least another secure proof using at least a secret. Where at least a secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. A group of devices so identified may have characteristics in common, such as instances and/or versions of hardware, firmware, or other elements, including without limitation secure computing modules as described in further detail below; identification that device is in group may, for instance, indicate that device may be trusted to a certain degree. Group membership, attestation, and/or inclusion in an attestation chain, for instance as described in this disclosure, may be specific to a piece of software running on a specific device, or to a hardware protected secure container (an enclave), such that any code executed within the enclave can be assumed to be executed as its instruction set dictates upon that instruction set being loaded into memory, or otherwise processed and/or transmitted via attestation chains, or be granted a certain confidence level, by virtue of degrees to which its secure computing module may be trusted to perform authentic attested processes or the like. Manufacturer and/or devices participating in embodiments of systems as described herein may receive, assign, or generate confidence levels associated with such group identities, including without limitation assignment of lower or minimal confidence levels for groups with regard to which a vulnerability to hacking or exploits has been identified, a group one member of which has been associated with an illegal, fraudulent, or undesirable act, a group one member of which has been compromised, hacked, or stolen, or the like. In an embodiment, where at least a member of a group has been compromised, given a lower confidence level, or the like, individual devices in group having device-specific secrets or private keys may sign transactions with such keys, sacrificing a degree of anonymity to differentiate themselves from compromised members of such groups. Alternatively, or additionally, a verifier of an attestation may require an attesting device to provide evidence that it is not one of a particular set of devices believed to have been compromised or otherwise revoked. Practically this list of malicious devices may include a list of suspected signatures created by such devices, rather than the device private key; proof of non-membership may include provision of proof that the attesting device could not have generated the same signature. In either case, attesting device may generate a proof of innocence by proving membership in an honest set (e.g., providing a datum signed by the device's private key or other persistent unique identifier to an authority). In an alternative embodiment, either as part of the algorithm determining the authenticity of a device or device-and-software component and assigning or refreshing certificates or credentials conferring some trusted status, and/or after initial assignment of certificates, a device is required to prove to an authority that it is not a member of a dishonest set (e.g. is not a device suspected of compromise), the compromised device being identified by an example of a signature created by said device or some other means. In such an example, the element wishing to prove innocence generates a proof that it could not have generated the example of a compromised signature.

In an embodiment, a protocol may be implemented that modifies a particular element of the credential issued to a device (a credential that confers in that device a device-specific, device-and-software specific, or set of one or more of the preceding) at some interval of time, that interval being fixed or variable. A result may be that at least the issuer or set of issuers may make a determination based on the credential issued to an element or the signature of said element as to in what interval of time, or time epoch, the credential was issued. Further, protocol may incorporate an algorithm that outputs a proof of a given device's innocence by either of the above means or in combination, the input of the algorithm being the set of suspected compromised signatures from the same time epoch. In contrast to existing approaches, a proof of innocence is specific to the set signatures from suspected compromised devices whose credentials were issued in the same window of time as the device providing the proof. Thus, rather than requiring that a device prove that it has not made any of the suspected compromised signatures over all time, the device may only be required to prove non-membership in or membership in a much smaller group, conferring significant performance benefit.

Continuing to refer to FIG. 1. Group keys and/or secrets may be embedded in hardware or software of devices during manufacture, as described in further detail below. Group keys and/or secrets may be assigned and/or signed by devices other than manufacturers; group keys and/or assignment of group keys may be used in direct anonymous attestation as described in further detail below. Group keys may enable processes of identification and/or attestation, such as without limitation direct anonymous attestation, to be performed in which a digital signature and/or secure proof confirms that an entity and/or device is part of a group but cannot determine which member of a group it is.

Still referring to FIG. 1. In other embodiments, for instance as described in further detail below, where trust in a single certificate authority is undesirable (e.g., where there is concern of the certificate authority and verifier colluding, or there is concern that a single certificate authority may be vulnerable to attack), the same functionality may be accomplished by a group of certificate authorities acting to authenticate in coordination, with the requirement that a threshold number of the group of certificate authorities (e.g. via multi-signature), and/or a threshold proportion of the group of certificate authorities, agree (e.g. "threshold cryptography"); a confidence level in each certificate authority may be determined according to any method or means described herein for determination of a confidence level in any device or entity, including without limitation in a cryptographic evaluator as described in further detail below. In an embodiment, certificate authorities that have a confidence level below a given threshold level may be eliminated; in other embodiments, certificate authority confidence levels may be aggregated according to any method shown herein. Additional embodiments may include group signature schemes that issue certificates on a membership public key generated by a secure computing module as described in further detail below; in such scenarios, authentication may include proof by the secure computing module that the secure computing module possesses a secret key to a public key/certificate pair. Although digital signatures have been introduced here as performed using public key cryptographic systems, digital signatures may alternatively or additionally be performed using symmetric cryptography and/or any interactive or non-interactive zero-knowledge proof; for instance, a proof may be recorded in conjunction with a datum, and a verification may be performed by any party seeking to evaluate the proof.

Still referring to FIG. 1. In some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process, that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the sheer amount of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

Continuing to refer to FIG. 1. In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the sheer amount of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2n/2)$ for n output bits; thus, it may take on the order of 2256 operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Additionally, or alternatively, and still referring to FIG. 1, the recharging pad may include a landing pad, where the landing pad may be any designated area for the electric airplane to land and/or takeoff. In one embodiment, the landing pad may be made of any suitable material and may be any dimension. In some embodiments, the landing pad may be a helideck or a helipad.

In some embodiments, and continuing to refer to FIG. 1, the recharging pad may include a recharging component coupled to the landing pad, where the recharging component may include any component with the capability of recharging an energy source, such as a battery, of the electric airplane. In one embodiment, the recharging component may include a constant voltage charger, a constant current charger, a taper current charger, a pulser charger, a negative pulse charger, an IUI charger, a trickle charger, a float charger, a random charger, and the like.

In one embodiment, and still referring to FIG. 1, recharging pad may include a support component coupled to the bottom of the landing pad, where the support component may include any space dedicated for supporting the electric aircraft. In some embodiments, the support component may include an area dedicated to storage, a workshop for aircraft maintenance, an area dedicated to logistics, a pilot lounge, sleeping accommodations, a generator, and the like. In a nonlimiting example, the flight pad is a raised platform that is wide enough for an eVTOL to land on it, furnished with a charging dock and with a compartment under the landing platform where the pilot may rest, or equipment related to electric vehicle charging may be stored.

Still referring to FIG. 1. In one embodiment, the flight controller 104 may be configured to receive the digital datum using a digital radio standard. In an embodiment, the digital radio standard may include, without limitations, a JTRS (Joint Tactical System), a SINCGARS (Single channel ground to air radio system), and the like. In embodiments, flight controller 104 may include a digital radio receiver. In embodiments, flight controller 104 is communicatively coupled to a digital radio receiver. In embodiments, flight controller 104 may be configured to transform an analog radio transmission into the digital datum. In embodiments, flight controller 104 may be configured to receive the digital datum through a mobile wireless network. Nonlimiting examples of wireless standards used by flight controller 104 may include 1G, 2G, 3G, 4G and 5G. In embodiments, flight controller 104 may be configured to receive digital datum through a mobile satellite communications and mobile satellite services (MMS). In nonlimiting examples, MMS communication may utilize Geostationary Orbit (GEO) satellites, Medium Earth Orbit (MEO) satellites, Low Earth Orbit (LEO) satellites, and the like. In a nonlimiting example, ground control may broadcast commands that may cause a change in a flight plan through a SINCGARS standard. In embodiments, flight controller 104 may be configured to receive the digital datum from a flight operator, such as sending a command to reduce speed as to conserve battery. In embodiments, flight controller 104 may be configured to authentication a connection with the remote device 108 before receiving the digital datum. In embodiments, flight controller 104 may utilize an authentication broker to authenticate the connection. In embodiments, digital datum may include authentication data, such as a device identifier. In an embodiment, digital datum may include an authentication token identifying the remote device. In embodiments, flight controller 104 may be configured to send a digital datum requesting authentication.

Continuing to refer to FIG. 1, flight controller 104 is configured to generate a plan adjustment datum as a function of the digital datum. "Plan adjustment datum" refers to elements of data that differs from the previously generated flight plan, such as a change in flight direction or change. In a nonlimiting example, the plan adjustment datum may include information related to the changes required to be made to the flight plan as to avoid a collision with another aircraft.

Still referring to FIG. 1, flight controller is configured to transmit the plan adjustment datum to a pilot display 112. In an embodiment, the pilot display 112 is communicatively connected to the flight controller 104. In embodiments, the remote device 108 includes the pilot display 112. In a nonlimiting example, pilot display 112 may include a smartphone operated by a fleet operator. In another nonlimiting example, the pilot display 112 may be a device operated by an air traffic controller.

With continued reference to FIG. 1, system 100 includes a pilot display 116 where the pilot display 116 is configured to receive the plan adjustment datum from the flight controller 104. In an embodiment, the pilot display 116 is configured to decrypt an encrypted plan adjustment datum. A "pilot display", as used herein for the purpose of this disclosure, is an output device for presentation of information in visual or tactile form. As a non-limiting example, a display device may include liquid crystal display (LCD), a cathode ray tube (CRT), a plasma display, a light emitting diode (LED) display, an electroluminescent (ELD) display, a quantum dot (QLED) display, and the like thereof in any combination. In an embodiment, and without limitation, pilot display 112 may include a primary flight display, multi-function display, and the like thereof. The pilot display 112 may include any computing device configured to display data such as a laptop, desktop, smartphone, computing tablet, smartwatch, and the like. Pilot display 112 is configured to present, to a user, information related to the flight plan. Pilot display 116 may include a graphical user interface, multi-function display (MFD), primary display, gauges, graphs, audio cues, visual cues, information on a heads-up display (HUD) or a combination thereof. Pilot display 112 may include a display disposed in one or more areas of an aircraft, on a user device remotely located, one or more computing devices 112, or a combination thereof. Pilot display 112 may be disposed in a projection, hologram, or screen within a user's helmet, eyeglasses, contact lens, or a combination thereof. Pilot display 112 may display the flight plan in graphical form. Graphical form may include a two-dimensional plot of two variables that represent data received by the flight controller 104, such as past flight trajectory and future flight plan. In one embodiment, pilot display 112 may also display the user's input in real-time. In a nonlimiting example, the pilot display 116 may display a two-dimensional plot with the past flight trajectory and the future planned flight trajectory.

Still referring to FIG. 1, pilot display 112 is further configured to display the plan adjustment datum to a user. Pilot display 112 is further configured to receive a confirmation datum from the user. In an embodiment, the pilot display 112 may be further configured to transmit the confirmation datum as a function of an input by the user. "Confirmation datum" refers to an element of data confirming the plan adjustment datum. In an embodiment, flight controller 104 may be configured to make changes to the flight plan as a function of the confirmation datum received from the user. In an embodiment, pilot display 112 may be further configured to encrypt the confirmation datum. In a nonlimiting example, a user may visualize a future flight plan through a smartphone. In another nonlimiting example, a fleet operator may visualize the past flight and current trajectory of an electric aircraft on a laptop. In some embodiments, the flight controller 104 may be configured to automatically transmit a change in the flight plan to a remote device 108.

Figure 2:
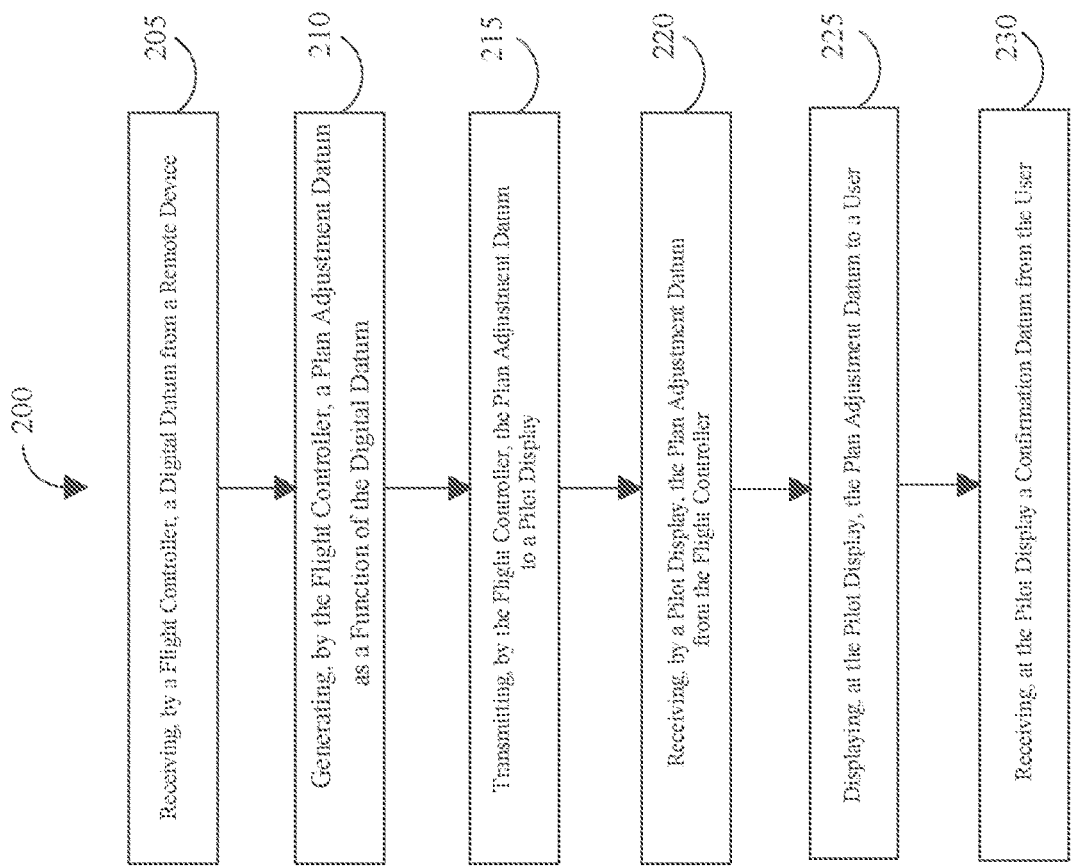
FIG. 2 is an exemplary flow diagram of a method for automated flight plan reporting in an electric aircraft.

Now referring to FIG. 2, an exemplary method 200 for automated flight plan reporting in an electric aircraft is illustrated. At step 205, the method 200 includes receiving, by the flight controller 104, a digital datum from a remote device 108. In an embodiment, method may further include receiving, by the flight controller 104, the digital datum as a function of a remote device. In embodiments, remote device may be an authentication broker. In a nonlimiting example, an air traffic control device may send a command to change its direction to a specified coordinates as to avoid another aircraft that has being routed through the electric aircraft's flight path described in its flight plan. In another nonlimiting example, flight controller 104 may authenticate the remote device sending the digital datum by using an authentication broker.

Still referring to FIG. 2, at step 210, method 200 includes generating, by the flight controller 104, a plan adjustment datum as a function of the digital datum. In a nonlimiting example, flight controller receives commands related to its flight from ground control and generates information related to the changes that will be effected on the set flight plan based on those commands, such as estimated total flight time based on a command to reduce speed relayed by ground control.

Continuing to refer to FIG. 2, at step 215, method 200 includes transmitting, by the flight controller 104, the plan adjustment datum to a pilot display 112. In a nonlimiting example, plan adjustment datum is sent over a cable connection when pilot display is locally connected to the flight controller 104, such as a display inside the electric vehicle's cockpit. In another nonlimiting example, flight controller 104 transmits the plan adjustment datum over a satellite connection. In embodiments, method may further include transmitting, by the flight controller, a credential to a broker; and receiving, by the flight controller, a token from the broker. In embodiments, method 200 may further include transmitting, by the flight controller, the token to the remote device as a function of the confirmation datum. In embodiments, method 200 may further include transmitting, by the flight controller, the plan adjustment datum using a digital radio standard.

Continuing to refer to FIG. 2, method 200, at step 220, includes receiving, at the pilot display 112, the plan adjustment datum from the flight controller 104. In a nonlimiting example, the plan adjustment datum is received through a mobile network, such as 4G.

Still referring to FIG. 2, at step 225, method 200 includes displaying, at the pilot display 112, the plan adjustment datum to a user. In an embodiment, original flight plan may also be displayed. In a nonlimiting example, pilot display 112 may display a graph representing the original flight path and a graph representing the new flight path based on the plan adjustment datum. In a nonlimiting example, pilot display 112 may display graphical representation of the changes to the flight plan based on the plan adjustment datum, where the changes are graphically presented being superimposed on top of the original flight plan.

Still referring to FIG. 2, method 200, at step 235, includes receiving, at the pilot display 112, a confirmation datum from the user. In embodiments, the confirmation datum may be a voice command. In embodiments, confirmation datum may be a click of a button. In a nonlimiting example, confirmation datum may be generated by a user clicking a "confirm changes" dialog box displayed through a touchscreen display. In embodiments, method may further include transmitting, by the flight controller, the plan adjustment datum to the remote device as a function of the confirmation datum. In embodiments, method 200 may further include receiving the confirmation datum, at the flight controller. In embodiments, method 200 may include storing, by the flight controller, the digital datum in a database; and storing, by the flight controller, the plan adjustment datum in the database as a function of the confirmation datum Now referring to FIG. 3A, an exemplary depiction of a brokered authentication 300 system is illustrated. In an embodiment, the authentication broker 304 may be a charging pad. In a nonlimiting example, the flight controller 104 makes a request for a confirmation datum to a remote device 108, system 100 then redirects the flight controller 104 request to the authentication broker 304, the authentication broker 304 then authenticate the flight controller 104 against a central identity store, if the flight controller 104 is successfully authenticated, the authentication broker 304 assigns a security token to the flight controller 104 and redirects the flight controller 104 request to the remote device 108, the remote device then sends a validation request for the flight controller 104 to the authentication broker 304, after validation is successful, the remote device 108 sends the flight confirmation datum to the flight controller 104. The authentication broker 304 may be used, without limitation, in any brokered authentication system. Authentication broker 304 may include any form of circuit suitable for use as any other component described herein, including without limitation an integrated circuit and/or a circuit configured using software, including without limitation key ladders, authentication broker 304 is configured to produce at least an output comprising proof of the module-specific secret.

Figure 3A:
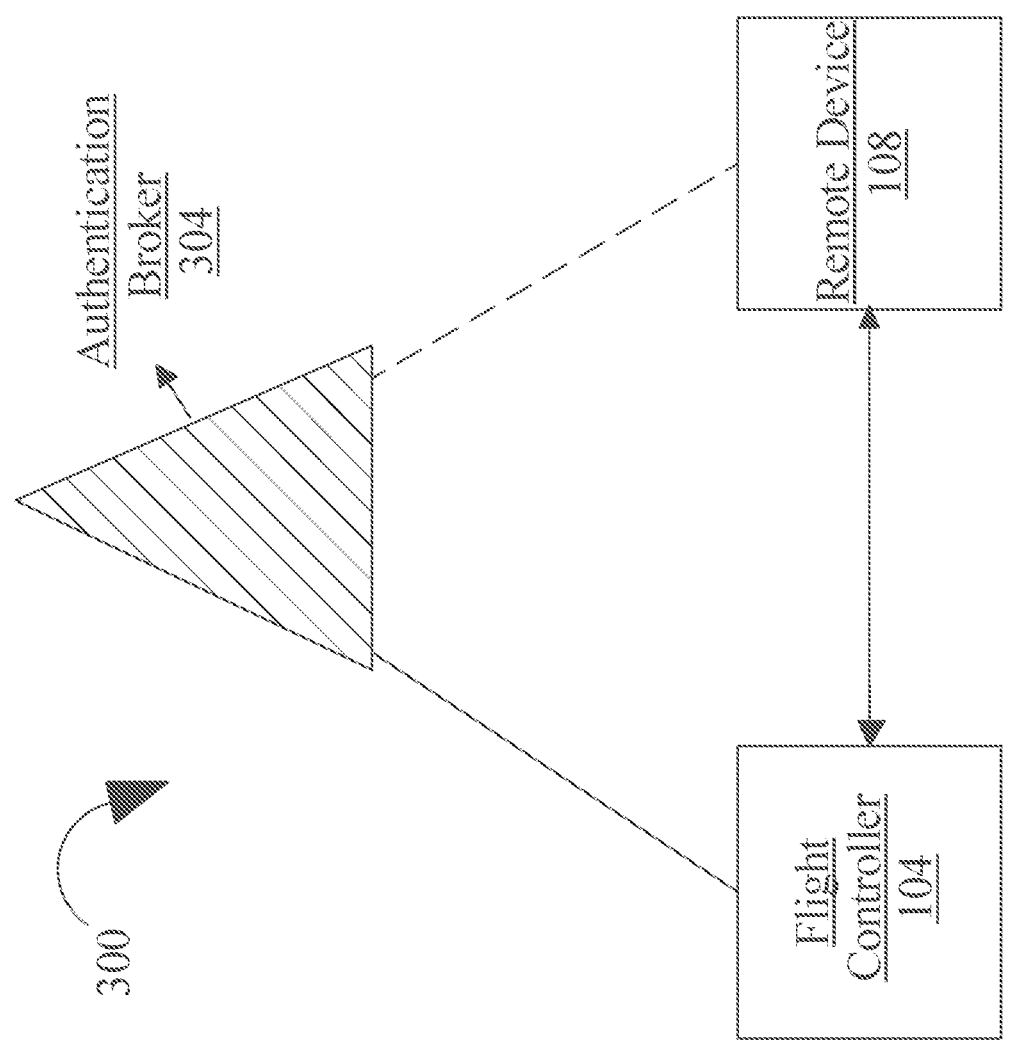
FIG. 3A is an exemplary diagram of a brokered authentication system.

Still referring to FIG. 3A. Authentication broker 304 may include a software-defined circuit; in other words, identity store 308 may include and/or consist of a software program implemented on a component of secure computing hardware apparatus and/or a computing device in which secure computing hardware apparatus is incorporated. Identity store 308 may include any means and/or components to create a cryptographic identity within the authentication broker 304.

Figure 3B:
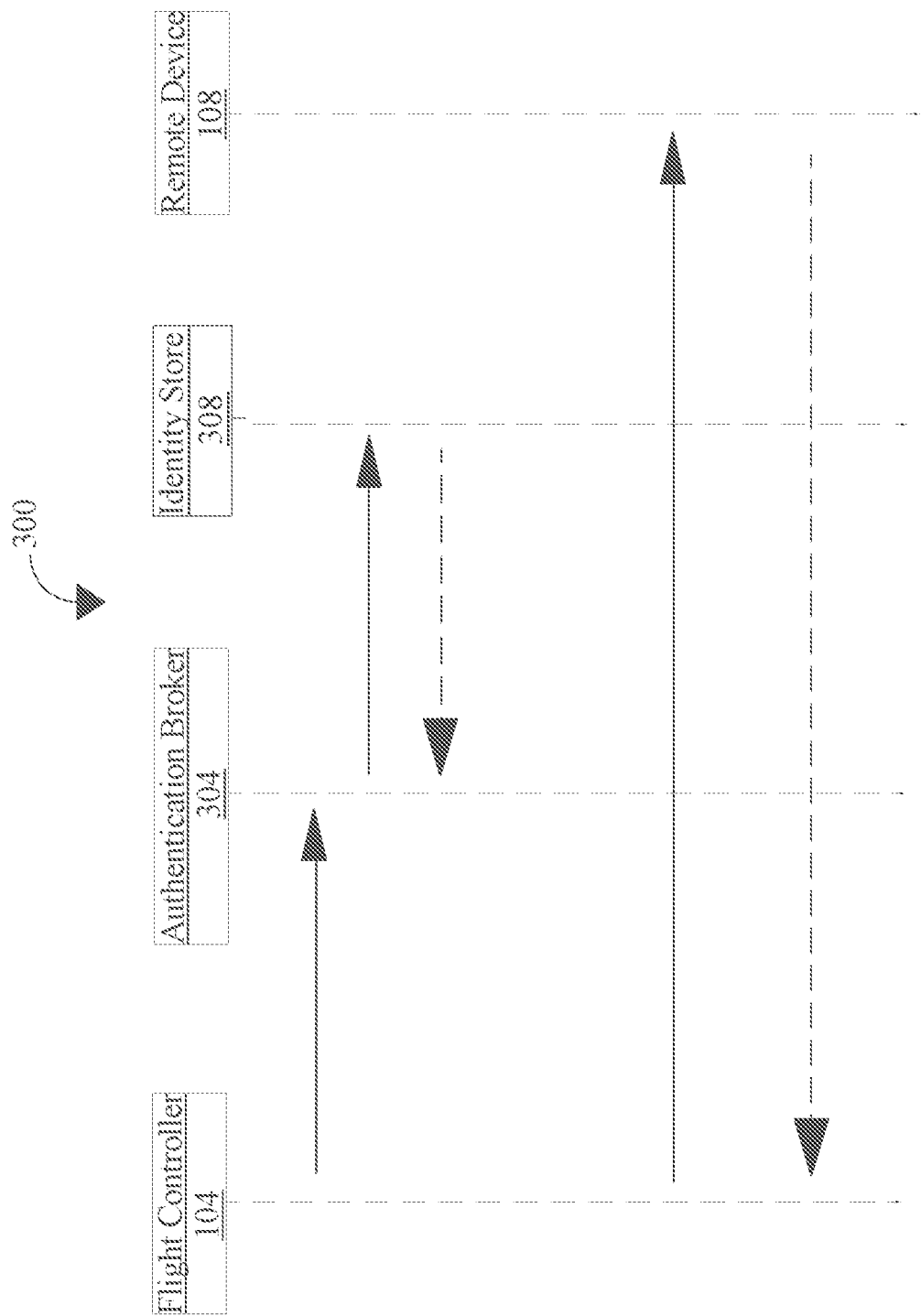
FIG. 3B is an exemplary representation of a brokered authentication process

Referring now to FIG. 3B, an exemplary diagram of a brokered authentication 300 process is shown. In a nonlimiting example, flight controller 104 sends an authentication request to the authentication broker 304, authentication broker 304 then validates the flight controller's 104 credential against an identity store 308, if valid, identity store 308 sends a validation response to the authentication broker 304. The authentication broker 304 proceeds to send a successful authentication response, that may include an authentication token, to the flight controller 104. Once validated by the authentication broker 304, flight controller 104 sends a request to a remote device 108 for a confirmation datum, the remote device 108 then service the request for the confirmation datum. In some embodiments, the identity store 308 may be a remote database. In some embodiments, the authentication broker 304 is locally connected to the identity store 308.

Still referring to FIG. 3B. In an embodiment, identity store 308 may select and/or generate a device identifier, secure proof, and/or cryptographic identity at random every time authentication broker 304 is invoked, at every boot and/or attested boot, or the like. A proof, as described throughout this disclosure, may include any element of data that demonstrates possession of the module-specific secret. Proof may include a secure proof of the module-specific secret. A secure proof, as described throughout this disclosure, may include a protocol whereby an output is generated that demonstrates possession of a secret, such as module-specific secret, without demonstrating the entirety of the module-specific secret; in other words, a secure proof by itself, is insufficient to reconstruct the entire module-specific secret, which enables the production of at least another secure proof using at least a module-specific secret while preventing spoofing or imitation by recipients or third-party listeners. Where at least a module-specific secret is a plurality of secrets, such as a plurality of challenge-response pairs, a secure proof may include an output that reveals the entirety of one of the plurality of secrets, but not all of the plurality of secrets, for instance, secure proof may be a response contained in one challenge-response pair. In an embodiment, proof may not be secure; in other words, proof may include a one-time revelation of at least a module-specific secret, for instance as used in a single challenge-response exchange.

Figure 4:
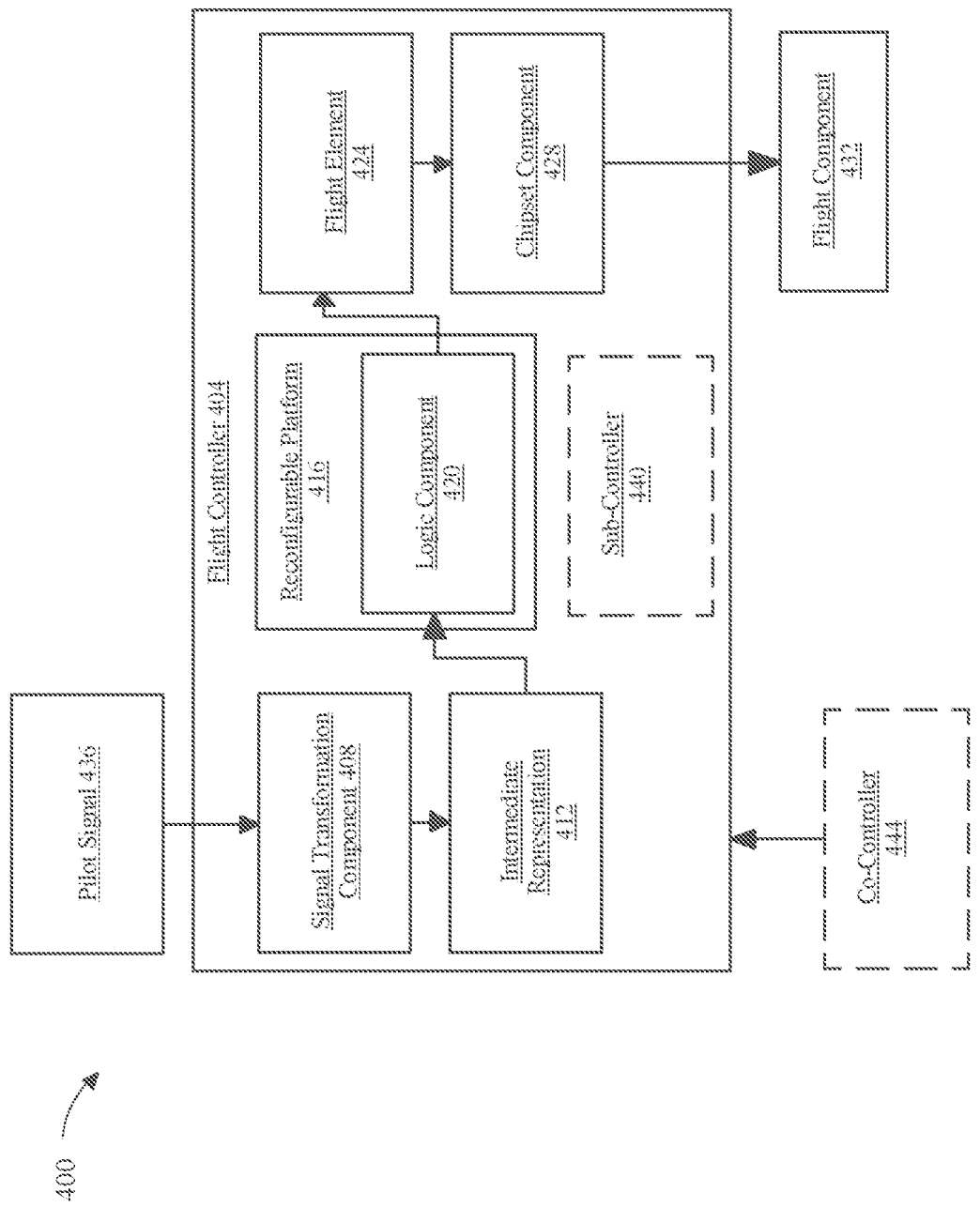
FIG. 4 an illustrative representation of flight controller.

Now referring to FIG. 4, an exemplary embodiment 400 of a flight controller 404 is illustrated. As used in this disclosure a "flight controller" is a computing device of a plurality of computing devices dedicated to data storage, security, distribution of traffic for load balancing, and flight instruction. Flight controller 404 may include and/or communicate with any computing device as described in this disclosure, including without limitation a microcontroller, microprocessor, digital signal processor (DSP) and/or system on a chip (SoC) as described in this disclosure. Further, flight controller 404 may include a single computing device operating independently, or may include two or more computing device operating in concert, in parallel, sequentially or the like; two or more computing devices may be included together in a single computing device or in two or more computing devices. In embodiments, flight controller 404 may be installed in an aircraft, may control the aircraft remotely, and/or may include an element installed in the aircraft and a remote element in communication therewith.

In an embodiment, and still referring to FIG. 4, flight controller 404 may include a signal transformation component 408. As used in this disclosure a "signal transformation component" is a component that transforms and/or converts a first signal to a second signal, wherein a signal may include one or more digital and/or analog signals. For example, and without limitation, signal transformation component 408 may be configured to perform one or more operations such as preprocessing, lexical analysis, parsing, semantic analysis, and the like thereof. In an embodiment, and without limitation, signal transformation component 408 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 408 may include transforming one or more low-level languages such as, but not limited to, machine languages and/or assembly languages. For example, and without limitation, signal transformation component 408 may include transforming a binary language signal to an assembly language signal. In an embodiment, and without limitation, signal transformation component 408 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 4, signal transformation component 408 may be configured to optimize an intermediate representation 412. As used in this disclosure an "intermediate representation" is a data structure and/or code that represents the input signal. Signal transformation component 408 may optimize intermediate representation as a function of a data-flow analysis, dependence analysis, alias analysis, pointer analysis, escape analysis, and the like thereof. In an embodiment, and without limitation, signal transformation component 408 may optimize intermediate representation 412 as a function of one or more inline expansions, dead code eliminations, constant propagation, loop transformations, and/or automatic parallelization functions. In another embodiment, signal transformation component 408 may optimize intermediate representation as a function of a machine dependent optimization such as a peephole optimization, wherein a peephole optimization may rewrite short sequences of code into more efficient sequences of code. Signal transformation component 408 may optimize intermediate representation to generate an output language, wherein an "output language," as used herein, is the native machine language of flight controller 404. For example, and without limitation, native machine language may include one or more binary and/or numerical languages.

In an embodiment, and without limitation, signal transformation component 408 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q-k-1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 4, flight controller 404 may include a reconfigurable hardware platform 416. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 416 may be reconfigured to enact any algorithm and/or algorithm selection process received from another computing device and/or created using machine-learning processes.

Still referring to FIG. 4, reconfigurable hardware platform 416 may include a logic component 420. As used in this disclosure a "logic component" is a component that executes instructions on output language. For example, and without limitation, logic component may perform basic arithmetic, logic, controlling, input/output operations, and the like thereof. Logic component 420 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 420 may be organized according to Von Neumann and/or Harvard architecture as a non-limiting example. Logic component 420 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC). In an embodiment, logic component 420 may include one or more integrated circuit microprocessors, which may contain one or more central processing units, central processors, and/or main processors, on a single metal-oxide-semiconductor chip. Logic component 420 may be configured to execute a sequence of stored instructions to be performed on the output language and/or intermediate representation 412. Logic component 420 may be configured to fetch and/or retrieve the instruction from a memory cache, wherein a "memory cache," as used in this disclosure, is a stored instruction set on flight controller 404. Logic component 420 may be configured to decode the instruction retrieved from the memory cache to opcodes and/or operands. Logic component 420 may be configured to execute the instruction on intermediate representation 412 and/or output language. For example, and without limitation, logic component 420 may be configured to execute an addition operation on intermediate representation 412 and/or output language.

In an embodiment, and without limitation, logic component 420 may be configured to calculate a flight element 424. As used in this disclosure a "flight element" is an element of datum denoting a relative status of aircraft. For example, and without limitation, flight element 424 may denote one or more torques, thrusts, airspeed velocities, forces, altitudes, groundspeed velocities, directions during flight, directions facing, forces, orientations, and the like thereof. For example, and without limitation, flight element 424 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 424 may denote that aircraft is following a flight path accurately and/or sufficiently.

Still referring to FIG. 4, flight controller 404 may include a chipset component 428. As used in this disclosure a "chipset component" is a component that manages data flow. In an embodiment, and without limitation, chipset component 428 may include a northbridge data flow path, wherein the northbridge dataflow path may manage data flow from logic component 420 to a high-speed device and/or component, such as a RAM, graphics controller, and the like thereof. In another embodiment, and without limitation, chipset component 428 may include a southbridge data flow path, wherein the southbridge dataflow path may manage data flow from logic component 420 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 428 may manage data flow between logic component 420, memory cache, and a flight component 432. As used in this disclosure a "flight component" is a portion of an aircraft that can be moved or adjusted to affect one or more flight elements. For example, flight component 432 may include a component used to affect the aircrafts' roll and pitch which may comprise one or more ailerons. As a further example, flight component 432 may include a rudder to control yaw of an aircraft. In an embodiment, chipset component 428 may be configured to communicate with a plurality of flight components as a function of flight element 424. For example, and without limitation, chipset component 428 may transmit to an aircraft rotor to reduce torque of a first lift propulsor and increase the forward thrust produced by a pusher component to perform a flight maneuver.

In an embodiment, and still referring to FIG. 4, flight controller 404 may be configured generate an autonomous function. As used in this disclosure an "autonomous function" is a mode and/or function of flight controller 404 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 424. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 404 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 404 will control the ailerons and/or rudders. As used in this disclosure "non-autonomous mode" is a mode that denotes a pilot will control aircraft and/or maneuvers of aircraft in its entirety.

In an embodiment, and still referring to FIG. 4, flight controller 404 may generate autonomous function as a function of an autonomous machine-learning model. As used in this disclosure an "autonomous machine-learning model" is a machine-learning model to produce an autonomous function output given flight element 424 and a pilot signal 436 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 436 may denote that a pilot is controlling and/or maneuvering ailerons, wherein the pilot is not in control of the rudders and/or propulsors. In an embodiment, pilot signal 436 may include an implicit signal and/or an explicit signal. For example, and without limitation, pilot signal 436 may include an explicit signal, wherein the pilot explicitly states there is a lack of control and/or desire for autonomous function. As a further non-limiting example, pilot signal 436 may include an explicit signal directing flight controller 404 to control and/or maintain a portion of aircraft, a portion of the flight plan, the entire aircraft, and/or the entire flight plan. As a further non-limiting example, pilot signal 436 may include an implicit signal, wherein flight controller 404 detects a lack of control such as by a malfunction, torque alteration, flight path deviation, and the like thereof. In an embodiment, and without limitation, pilot signal 436 may include one or more explicit signals to reduce torque, and/or one or more implicit signals that torque may be reduced due to reduction of airspeed velocity. In an embodiment, and without limitation, pilot signal 436 may include one or more local and/or global signals. For example, and without limitation, pilot signal 436 may include a local signal that is transmitted by a pilot and/or crew member. As a further non-limiting example, pilot signal 436 may include a global signal that is transmitted by air traffic control and/or one or more remote users that are in communication with the pilot of aircraft. In an embodiment, pilot signal 436 may be received as a function of a tri-state bus and/or multiplexor that denotes an explicit pilot signal should be transmitted prior to any implicit or global pilot signal.

Still referring to FIG. 4, autonomous machine-learning model may include one or more autonomous machine-learning processes such as supervised, unsupervised, or reinforcement machine-learning processes that flight controller 404 and/or a remote device may or may not use in the generation of autonomous function. As used in this disclosure "remote device" is an external device to flight controller 404. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 4, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 404 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 4, flight controller 404 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 404. Remote device and/or FPGA may transmit a signal, bit, datum, or parameter to flight controller 404 that at least relates to autonomous function. Additionally or alternatively, the remote device and/or FPGA may provide an updated machine-learning model. For example, and without limitation, an updated machine-learning model may be comprised of a firmware update, a software update, a autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 404 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 4, flight controller 404 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 4, flight controller 404 may include, but is not limited to, for example, a cluster of flight controllers in a first location and a second flight controller or cluster of flight controllers in a second location. Flight controller 404 may include one or more flight controllers dedicated to data storage, security, distribution of traffic for load balancing, and the like. Flight controller 404 may be configured to distribute one or more computing tasks as described below across a plurality of flight controllers, which may operate in parallel, in series, redundantly, or in any other manner used for distribution of tasks or memory between computing devices. For example, and without limitation, flight controller 404 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Mass., USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 4, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 432. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 4, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 404. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 412 and/or output language from logic component 420, wherein output language may include one or more analog-to-digital conversions, low bit rate transmissions, message encryptions, digital signals, binary signals, logic signals, analog signals, and the like thereof described above in detail.

Still referring to FIG. 4, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 4, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 4, flight controller 404 may also be implemented using a "shared nothing" architecture in which data is cached at the worker, in an embodiment, this may enable scalability of aircraft and/or computing device. Flight controller 404 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 4, flight controller may include a sub-controller 440. As used in this disclosure a "sub-controller" is a controller and/or component that is part of a distributed controller as described above; for instance, flight controller 404 may be and/or include a distributed flight controller made up of one or more sub-controllers. For example, and without limitation, sub-controller 440 may include any controllers and/or components thereof that are similar to distributed flight controller and/or flight controller as described above. Sub-controller 440 may include any component of any flight controller as described above. Sub-controller 440 may be implemented in any manner suitable for implementation of a flight controller as described above. As a further non-limiting example, sub-controller 440 may include one or more processors, logic components and/or computing devices capable of receiving, processing, and/or transmitting data across the distributed flight controller as described above. As a further non-limiting example, sub-controller 440 may include a controller that receives a signal from a first flight controller and/or first distributed flight controller component and transmits the signal to a plurality of additional sub-controllers and/or flight components.

Still referring to FIG. 4, flight controller may include a co-controller 444. As used in this disclosure a "co-controller" is a controller and/or component that joins flight controller 404 as components and/or nodes of a distributer flight controller as described above. For example, and without limitation, co-controller 444 may include one or more controllers and/or components that are similar to flight controller 404. As a further non-limiting example, co-controller 444 may include any controller and/or component that joins flight controller 404 to distributer flight controller. As a further non-limiting example, co-controller 444 may include one or more processors, logic components and/or computing devices capable of receiving, processing, and/or transmitting data to and/or from flight controller 404 to distributed flight control system. Co-controller 444 may include any component of any flight controller as described above. Co-controller 444 may be implemented in any manner suitable for implementation of a flight controller as described above.

In an embodiment, and with continued reference to FIG. 4, flight controller 404 may be designed and/or configured to perform any method, method step, or sequence of method steps in any embodiment described in this disclosure, in any order and with any degree of repetition. For instance, flight controller 404 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 5:
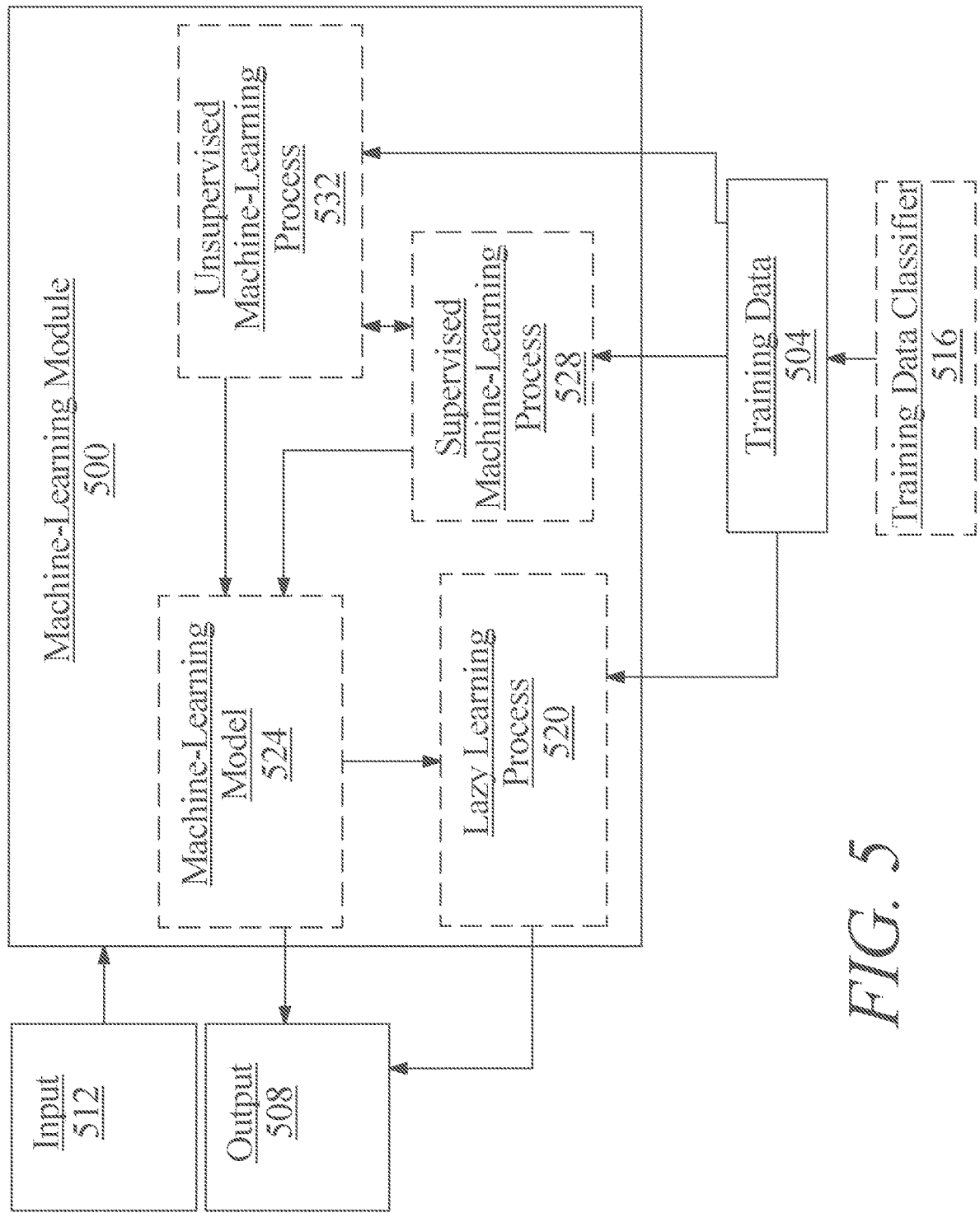
FIG. 5 is a diagrammatic illustration of a machine learning process.

Referring now to FIG. 5, an exemplary embodiment of a machine-learning module 500 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 504 to generate an algorithm that will be performed by a computing device/module to produce outputs 508 given data provided as inputs 512; this is in contrast to a non-machine learning software program where the commands to be executed are determined in advance by a user and written in a programming language.

Still referring to FIG. 5, "training data," as used herein, is data containing correlations that a machine-learning process may use to model relationships between two or more categories of data elements. For instance, and without limitation, training data 504 may include a plurality of data entries, each entry representing a set of data elements that were recorded, received, and/or generated together; data elements may be correlated by shared existence in a given data entry, by proximity in a given data entry, or the like. Multiple data entries in training data 504 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 504 according to various correlations; correlations may indicate causative and/or predictive links between categories of data elements, which may be modeled as relationships such as mathematical relationships by machine-learning processes as described in further detail below. Training data 504 may be formatted and/or organized by categories of data elements, for instance by associating data elements with one or more descriptors corresponding to categories of data elements. As a non-limiting example, training data 504 may include data entered in standardized forms by persons or processes, such that entry of a given data element in a given field in a form may be mapped to one or more descriptors of categories. Elements in training data 504 may be linked to descriptors of categories by tags, tokens, or other data elements; for instance, and without limitation, training data 504 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 5, training data 504 may include one or more elements that are not categorized; that is, training data 504 may not be formatted or contain descriptors for some elements of data. Machine-learning algorithms and/or other processes may sort training data 504 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 504 to be made applicable for two or more distinct machine-learning algorithms as described in further detail below. Training data 504 used by machine-learning module 500 may correlate any input data as described in this disclosure to any output data as described in this disclosure. As a non-limiting illustrative example flight elements and/or pilot signals may be inputs, wherein an output may be an autonomous function.

Further referring to FIG. 5, training data may be filtered, sorted, and/or selected using one or more supervised and/or unsupervised machine-learning processes and/or models as described in further detail below; such models may include without limitation a training data classifier 516. Training data classifier 516 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 500 may generate a classifier using a classification algorithm, defined as a processes whereby a computing device and/or any module and/or component operating thereon derives a classifier from training data 504. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to sub-categories of flight elements such as torques, forces, thrusts, directions, and the like thereof.

Still referring to FIG. 5, machine-learning module 500 may be configured to perform a lazy-learning process 520 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 504. Heuristic may include selecting some number of highest-ranking associations and/or training data 504 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 5, machine-learning processes as described in this disclosure may be used to generate machine-learning models 524. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 524 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 524 may be generated by creating an artificial neural network, such as a convolutional neural network comprising an input layer of nodes, one or more intermediate layers, and an output layer of nodes. Connections between nodes may be created via the process of "training" the network, in which elements from a training data 504 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 5, machine-learning algorithms may include at least a supervised machine-learning process 528. At least a supervised machine-learning process 528, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 504. Persons skilled in the art, upon reviewing the entirety of this disclosure, will be aware of various possible variations of at least a supervised machine-learning process 528 that may be used to determine relation between inputs and outputs. Supervised machine-learning processes may include classification algorithms as defined above.

Further referring to FIG. 5, machine learning processes may include at least an unsupervised machine-learning processes 532. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 5, machine-learning module 500 may be designed and configured to create a machine-learning model 524 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 5, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 6:
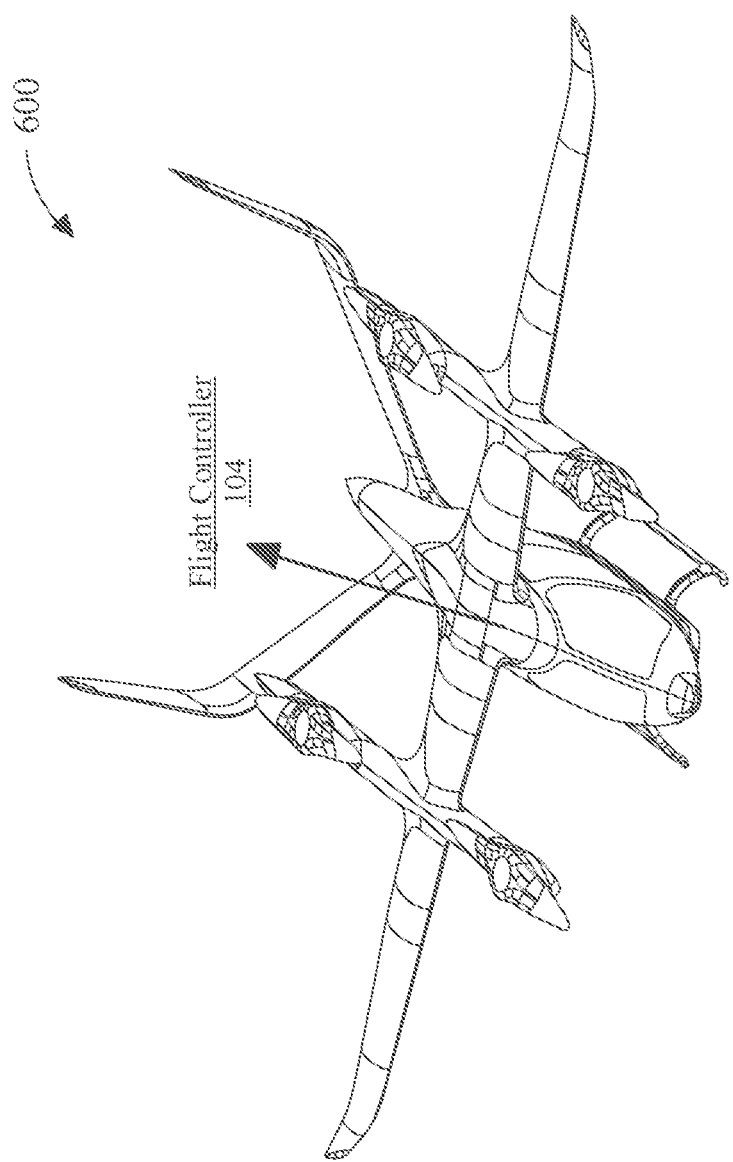
FIG. 6 is an exemplary embodiment of an electric aircraft.

Referring now to FIG. 6, an embodiment of an electric aircraft 600 is presented. Still referring to FIG. 6, electric aircraft 600 may include a vertical takeoff and landing aircraft (eVTOL). As used herein, a vertical take-off and landing (eVTOL) aircraft is one that can hover, take off, and land vertically. An eVTOL, as used herein, is an electrically powered aircraft typically using an energy source, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

With continued reference to FIG. 6, a number of aerodynamic forces may act upon the electric aircraft 600 during flight. Forces acting on an electric aircraft 600 during flight may include, without limitation, thrust, the forward force produced by the rotating element of the electric aircraft 600 and acts parallel to the longitudinal axis. Another force acting upon electric aircraft 600 may be, without limitation, drag, which may be defined as a rearward retarding force which is caused by disruption of airflow by any protruding surface of the electric aircraft 600 such as, without limitation, the wing, rotor, and fuselage. Drag may oppose thrust and acts rearward parallel to the relative wind. A further force acting upon electric aircraft 600 may include, without limitation, weight, which may include a combined load of the electric aircraft 600 itself, crew, baggage, and/or fuel. Weight may pull electric aircraft 600 downward due to the force of gravity. An additional force acting on electric aircraft 600 may include, without limitation, lift, which may act to oppose the downward force of weight and may be produced by the dynamic effect of air acting on the airfoil and/or downward thrust from the propulsor of the electric aircraft. Lift generated by the airfoil may depend on speed of airflow, density of air, total area of an airfoil and/or segment thereof, and/or an angle of attack between air and the airfoil. For example, and without limitation, electric aircraft 600 are designed to be as lightweight as possible. Reducing the weight of the aircraft and designing to reduce the number of components is essential to optimize the weight. To save energy, it may be useful to reduce weight of components of an electric aircraft 600, including without limitation propulsors and/or propulsion assemblies. In an embodiment, the motor may eliminate need for many external structural features that otherwise might be needed to join one component to another component. The motor may also increase energy efficiency by enabling a lower physical propulsor profile, reducing drag and/or wind resistance. This may also increase durability by lessening the extent to which drag and/or wind resistance add to forces acting on electric aircraft 600 and/or propulsors.

Still referring to FIG. 6, electric aircraft 600 may include a flight controller 104, where the flight controller may be communicatively connected to a computing device 112, such as a pilot display 116. In some embodiments, electric aircraft 600 may a pilot display 116 inside the cockpit.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
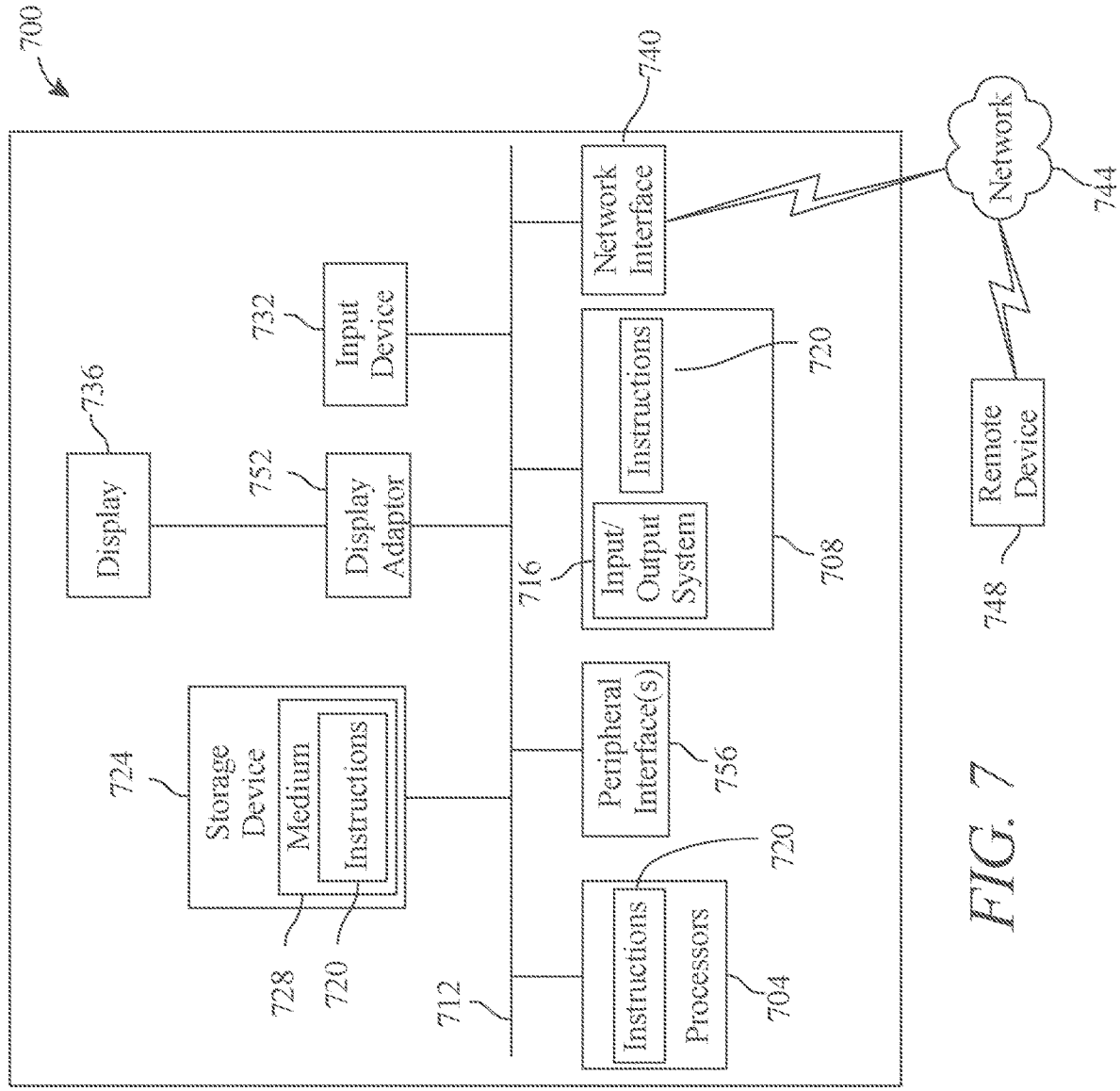
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for automated flight plan reporting for an electric aircraft, the system comprising:
    a flight controller coupled to the electric aircraft, wherein the flight controller is configured to:
        receive a digital datum from a remote device, wherein:
            the remote device is an authentication broker; and
            the digital datum includes a credential;
        authenticate the credential;
        generate a plan adjustment datum as a function of the authenticated digital datum; and
        transmit the plan adjustment datum to a pilot display;
    a pilot display coupled to the electric aircraft, wherein the pilot display is configured to:
        receive the plan adjustment datum from the flight controller;
        display the plan adjustment datum to a user; and
        receive a confirmation datum from the user.

2. The system of claim 1, wherein the flight controller is further configured to receive the digital datum as a function of a remote device.

3. The system of claim 1, wherein the flight controller is further configured to transmit the plan adjustment datum to the remote device as a function of the confirmation datum.

4. The system of claim 1, wherein the flight controller is further configured to:
    transmit a credential to a broker; and
    receive a token from the broker.

5. The system of claim 4, wherein the flight controller is further configured to transmit the token to the remote device as a function of the confirmation datum.

6. The system of claim 1, wherein the remote device is a flight management device.

7. The system of claim 1, wherein the flight controller is further configured to transmit the flight adjustment datum using a digital radio standard.

8. The system of claim 1, wherein the flight controller is further configured to encrypt the flight adjustment datum.

9. The system of claim 1, wherein the flight controller is further configured to decrypt an encrypted confirmation datum.

10. The system of claim 1, wherein the flight controller is further configured to:
   store the digital datum in a database; and
   store the plan adjustment datum in the database as a function of the confirmation datum.

11. A method for automated flight plan reporting in an electric aircraft, the method comprising:
   receiving, by a flight controller, a digital datum from a remote device wherein:
      the remote device is an authentication broker; and
      the digital datum includes a credential;
   authenticate the credential;
   generating, by the flight controller, a plan adjustment datum as a function of the authenticated digital datum;
   transmitting, by the flight controller, the plan adjustment datum to a pilot display;
   receiving, by a pilot display, the plan adjustment datum from the flight controller;
   displaying, at the pilot display, the plan adjustment datum to a user; and
   receiving, at the pilot display a confirmation datum from the user.

12. The method of claim 11, wherein method further comprises receiving, by the flight controller, the digital datum as a function of a remote device.

13. The method of claim 12, wherein the remote device is an authentication broker.

14. The method of claim 11, wherein method further comprises transmitting, by the flight controller, the plan adjustment datum to the remote device as a function of the confirmation datum.

15. The method of claim 11, wherein method further comprises:
   transmitting, by the flight controller, a credential to a broker; and
   receiving, by the flight controller, a token from the broker.

16. The method of claim 15, wherein the method further transmitting, by the flight controller, the token to the remote device as a function of the confirmation datum.

17. The method of claim 11, wherein method further comprises transmitting, by the flight controller, the flight adjustment datum using a digital radio standard.

18. The method of claim 11, wherein method further comprises receiving the confirmation datum, at the flight controller.

19. The method of claim 11, wherein the method further comprises:
   storing, by the flight controller, the digital datum in a database; and
   storing, by the flight controller, the plan adjustment datum in the database as a function of the confirmation datum.

\* \* \* \* \*